(No Model.)
DE WITT W. PAGE.
HORSE HITCHING DEVICE.
No. 549,150. Patented Nov. 5, 1895.
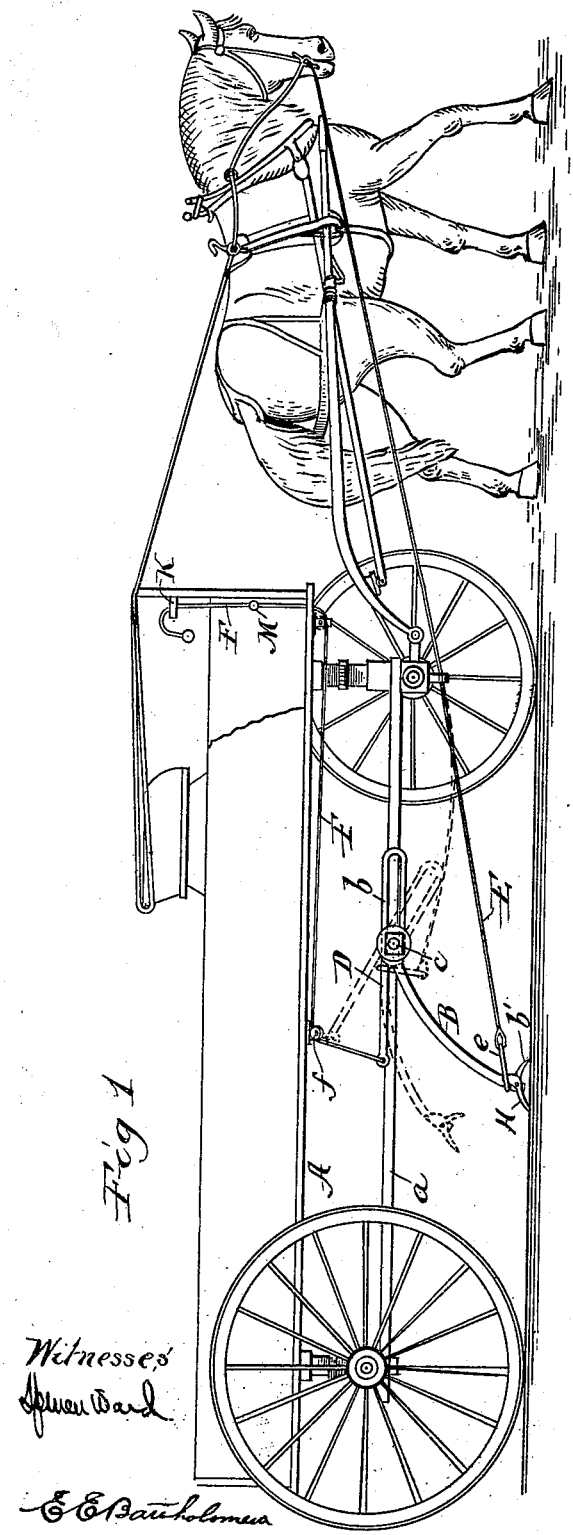
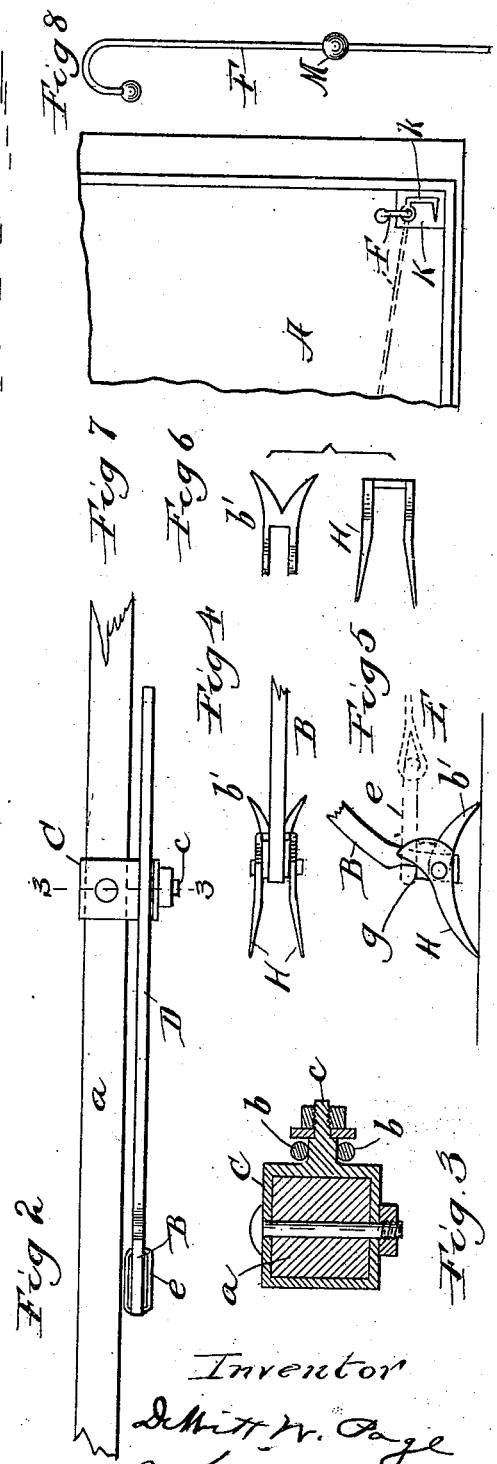
Witnesses
Inventor
DeWitt W. Page
By Louis K. Gibson
Attorney

UNITED STATES PATENT OFFICE.

DE WITT W. PAGE, OF EVANSTON, ILLINOIS.

HORSE-HITCHING DEVICE.

SPECIFICATION forming part of Letters Patent No. 549,150, dated November 5, 1895.

Application filed March 11, 1895. Serial No. 541,282. (No model.)

*To all whom it may concern:*

Be it known that I, DE WITT W. PAGE, a citizen of the United States, residing at Evanston, in the county of Cook and State of Illinois, have invented certain new and useful Improvements in Horse-Hitching Devices; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to horse-hitching devices in which a lever attached to a portion of the vehicle is adapted to engage the earth and is connected by means of a strap or cord with the bridle-bit. Its object is to provide for the secure hitching of the animal while relieving him from strain upon the bit while he stands still.

A further object is to prevent the animal from backing, and to provide easy and convenient means for securing the animal without the use of a cumbersome weight and without the annoyance of tying him to a fixture.

The invention consists of a curved lever pivotally attached to a portion of the vehicle and normally supported by a cord or strap passing into the body of the same and adapted, when lowered, to engage the earth or road-bed by means of claws projecting forward and backward, and a rein connecting the lower end of the lever with the bridle-bit.

The invention further consists of various minor details of construction and arrangement of parts, as hereinafter fully set forth.

In the drawings, Figure 1 is a side elevation, partly in section, of a vehicle and horse, showing my improved hitching device in use. Fig. 2 is a detail plan view of the hitching device. Fig. 3 is a sectional view on the line 3 3 of Fig. 2. Fig. 4 is a plan view of the lower end of the hitching-lever. Fig. 5 is a side elevation of the same. Fig. 6 is a plan view of the lever-claws. Fig. 7 is a detail plan of a portion of the body of the vehicle. Fig. 8 is a detail of the cord for controlling the device.

The body of the vehicle is indicated at A, and its reach at $a$. The hitching-lever is shown at B, and is pivotally connected with the reach $a$ by means of the pin $c$. This pin is secured to the reach in any desired manner. As shown it is by means of a clip C encircling and securely bolted to the reach. The lever B is straight through approximately one-third of its length, commencing at its upper end, and that portion is in the form of a loop, as indicated at $b$, the pin $c$ passing loosely through this loop and forming thereby the pivotal attachment of the lever to the reach. The remaining two-thirds, approximately, of the lever deflects downwardly from the line of direction of the straight portion and is preferably curved, as shown, and terminates in a forwardly-projecting claw $b'$. The lever is recessed or notched, as indicated at $g$, upon its rearward side and near its lower end and is provided with a backwardly-projecting claw H, pivotally attached to the main portion of the lever a little below the notch $g$, its upper end being adapted to travel across this notch. The outer or lower end of the claw H is heavier than its upper end, so that when the lever is raised from the ground it tends to fall and throws the upper end across the notch.

An arm D projects backwardly from the lever B, setting out from the juncture of the straight with the curved portion and being in alignment with the straight portion. A cord F is attached to the outer end of the arm D, and passing over a sheave $f$, secured to the under side of the body A of the vehicle, is carried forwardly and upwardly through the bottom of the box and terminates in the position where it is in convenient reach of the driver. The upper end of the cord F passes through a slotted plate K, the slot $k$ being enlarged at one end, so as to admit the passage of a button M, mounted upon the cord F, the cord being adapted to enter the narrow portion of the slot $k$, whereby the button M serves as a support for the cord and holds the lever B in an elevated position, as indicated by dotted lines in Fig. 1.

The rein or cord E connects the bridle-bit with the lever B, and is connected with the latter by means of a ring e, adapted freely to slide upon the curved portion of the lever and to enter the notch g when the lever is down.

In use the lever is normally held in its elevated position by means of the cord F. When the driver desires to leave the vehicle, he removes the button M from the slot k and allows the front end of the lever B to drop to the ground. This is done after the horse is stopped and consequently the traces are slack. As the lever B falls, the ring e slides to its outer end and engages the notch g. Should the animal move forward, the rein E will be drawn taut and the claw b' will be buried in the road-bed, positively stopping forward movement of the animal. Should the animal endeavor to back, the claw H, which has fallen by its own weight, will dig into the road-bed and the loop b of the lever will slide upon the pin c until the latter is at its rearward end, when further backward movement of the vehicle is positively stopped. The position of the loop b upon the pin c is immaterial for the purpose of checking the forward movement of the horse. Normally, as shown, the pin is at the rear end of the loop. Should the horse be so attached to the vehicle that the traces slacked but little, the first forward movement may carry the pin c forward in the loop b before strain is applied to the bit by means of the rein E. In this event, however, the horse is not held in a perfectly fixed and uncomfortable position for the reason that he may move back sufficient to carry the pin c to the forward end of the loop b. The hitching device is thrown out of use by again drawing up on the cord F and securing the button M to the plate K, and as it ascends the weighted claw H drops and its outer end at once disengages the ring e from the notch g, and the weight of the rein E will cause the ring e to slide upon the curved body portion of the lever B.

While I have shown the hitching device as secured to the reach of the vehicle, it is clear that it may be attached to any other portion thereof, as desired, though it will be more serviceable by locating it along the middle line of the vehicle. The rein E may be allowed to hang loosely between its ends or may be supported in any desired manner.

I prefer to form the claw b' as a separate piece, and so pivot it to the lower end of the lever B that its backward movement will be limited. By this construction the claw is more readily loosened from engagement with the road-bed when the horse backs.

I claim as my invention—

1. In a horse hitching device the combination with the vehicle, of a backwardly inclined lever pivoted to and pendent from the vehicle, and having a forwardly projecting claw at its lower end, and a rein leading from the lever below its pivotal point and adapted for attachment to the horse, whereby the lever is caused to engage the road bed with a toggle action.

2. The combination with the vehicle, of a lever pivoted to the same and adapted to extend downwardly and backwardly and engage the road bed, and having a notch at its rearward side and near its lower end, a rein adapted to extend backwardly from the bridle bit of the horse, a ring attached to the rearward end of the rein encircling the lever and adapted to engage the notch thereon, and means for disengaging the ring from the notch.

3. The combination with the vehicle, of a lever pivoted to the same and adapted to extend downwardly and backwardly and engage the road bed, and having a notch at its rearward side and near its lower end, a rein adapted to extend backwardly from the bridle bit of the horse, a ring attached to the rearward end of the rein encircling the lever and adapted to engage the notch thereon, and a weighted claw pivotally attached to and projecting backwardly from the lower end of the lever and constructed to have its upper end travel across the notch.

4. The combination with the vehicle, of a lever straight from one end through a portion of its length, such straight section being longitudinally slotted to form a loop, and bearing away from the alignment of such straight portion through the remainder of its length, a pivot pin fixed to the vehicle and engaging the loop of the lever, and being so located that the lever may swing downward and its outer or lower end may engage the road bed, and a rein for connecting the outer end of the lever with the bridle bit, substantially as described and for the purpose specified.

5. The combination with the vehicle, of a lever straight from one end through a portion of its length, such straight section being longitudinally slotted to form a loop, and bearing away from the alignment of such straight portion through the remainder of its length, a pivot pin fixed to the vehicle and engaging the loop of the lever, and being so located that the lever may swing downward and its outer or lower end may engage the road bed, a rein for connecting the outer end of the lever with the bridle bit, and a ring for securing the rein to the lever and adapted to slide upon its outer portion, said lever being notched for the engagement of the ring near its outer end.

6. The combination with the vehicle, of a lever straight from one end through a portion of its length, such straight section being longitudinally slotted to form a loop, and bearing away from the alignment of such straight portion through the remainder of its length, a pivot pin fixed to the vehicle and engaging the loop of the lever, and being so located that the lever may swing downward and its outer or lower end may engage the road bed, a rein for connecting the outer end of the lever with the bridle bit, a ring for securing the rein to the lever and adapted to slide upon its outer portion, said lever being notched for the engagement of the ring near its outer end, and a cord leading upwardly from the lever whereby the vertical adjustment of the latter is controlled, substantially as described and for the purpose set forth.

In testimony whereof I affix my signature in presence of two witnesses.

DE WITT W. PAGE.

Witnesses:
E. E. BARTHOLOMEW,
LOUIS K. GILLSON.